United States Patent [19]

Wand

[11] 4,275,591

[45] * Jun. 30, 1981

[54] PROTECTIVE SHIELD FOR CAPILLARY PIPETTE

[75] Inventor: Bruce Wand, Randolph Township, Morris County, N.J.

[73] Assignee: Becton, Dickinson and Company, Paramus, N.J.

[ * ] Notice: The portion of the term of this patent subsequent to Jun. 30, 1998, has been disclaimed.

[21] Appl. No.: 818,617

[22] Filed: Jul. 25, 1977

[51] Int. Cl.[3] .......................... B01L 3/02; G01N 1/14

[52] U.S. Cl. ....................................73/864.01; 128/763; 206/306; 206/519; 73/864.02

[58] Field of Search ......................... 73/425.4 P, 425.6; 128/218 M, 218 N; 206/518, 519, 222, 306; 422/100; 215/DIG. 3, 247

[56] References Cited

U.S. PATENT DOCUMENTS

| | | | |
|---|---|---|---|
| 3,021,942 | 2/1962 | Hamilton | 128/218 NX |
| 3,494,201 | 2/1970 | Roach | 73/425.6 |
| 3,518,804 | 7/1970 | Gerade | 53/37 |
| 3,779,083 | 12/1973 | Ayres et al. | 73/425.4 P |
| 3,796,218 | 3/1974 | Burke et al. | 128/218 M X |
| 3,807,955 | 4/1974 | Note et al. | 206/519 X |
| 3,911,916 | 10/1975 | Stevens | 128/218 N X |
| 4,072,330 | 2/1978 | Brysch | 73/425.4 P |

*Primary Examiner*—Daniel M. Yasich

[57] ABSTRACT

A shield is provided which is adapted for use in protecting a capillary pipette of a pipette assembly. The shield includes a hollow tubular body closed at one end and open at the other end. The open end of the shield is designed for removably mounting the shield on a pipette assembly with the capillary pipette thereof in protected position in the hollow tubular body. The body is formed at the closed end to facilitate use of the shield as a puncturing device. A shoulder is intermediate the ends of the body to provide a stop for preventing over extension of the closed end when used as a puncturing device and providing an engaging surface for the open end of another shield when at least two shields are nested together. When nested, the closed end of one shield extends into the open end of the next shield. By use of the shoulder and the configuration of the outer surface of a shield body, the degree of nesting is controlled and ease of removal of each shield for use is facilitated.

5 Claims, 6 Drawing Figures

PROTECTIVE SHIELD FOR CAPILLARY PIPETTE

BACKGROUND OF THE INVENTION

Micro-pipetting of samples of fluid such as blood by use of small volume capillary tubes is a highly developed and advanced state of art. It is conventional in the known system to provide a shield for the pipette when it is not in use as a protective device. The shield is removably positioned on the pipette assembly so that it can be removed from the pipette when the pipette is introduced to the sample producing source for pipetting activity. Throughout the years, the shield has been used for various other purposes. For example, the shield is often used as a puncturing device since it has a closed protective end and forms a cap for the pipette. The closed end can be used to puncture diaphragms on reservoirs containing diluents and other types of medicaments to be used with the sample collected in the pipette.

It should also be kept in mind that with present day technology the entire pipetting system including the shields are manufactured of low cost disposable materials which are mass produced in large numbers. In view of the cost factor, it is naturally important to maintain as low a cost as possible from a manufacturing and use standpoint.

Naturally, automation has significantly reduced costs for mass produced items and pipette assemblies fall within this general category. Thus, the pipette assembly including the shields are independently automatically mass produced and assembled prior to use. During this procedure, it is not unusual for the shields to stack or nest one within the other as part of an automated system or even a manual system prior to assembling the shields to individual receiving pipettes in their protective capacity. With conventional type of pipettes shields presently in use, nesting of the shields often results in frictional interengagement or locking of the shields together which makes their disassembly more difficult when they are individually introduced to a receiving pipette. It is envisioned that a cost reduction can be provided if the shields could be nested in a manner which facilitates their ease of removal from one another for assembly with the remainder of the pipetting assembly.

Furthermore, an improved shield structure which facilitates its use as a puncturing device naturally also would be desirable in the art. Particularly, it would be helpful if the puncturing device could contain control means thereon to facilitate limitation of the penetration of the device after it has accomplished the initial puncturing action. This naturally provides a guard against contamination of the end of the shield which would occur if the shield contacts the contents of the reservoir.

Micro-pipettes with protective shields are known in many diverse fields. One particular area of common use is in the medical field where small samples of fluid such as precise micro-quantities of blood are collected and tested. Naturally other pipetting fields also require the use of a protective shield to guard the pipette when it is not being used. An example of a prior art patent in this area relating to general pipetting procedure and where a protective shield is employed is Roach U.S. Pat. No. 3,494,201 issued on Feb. 10, 1970. In contrast, examples of the type of pipette assembly under consideration which pertain to the medical profession are disclosed in U.S. Pat. Nos. 2,965,255 to Gerarde on Dec. 20, 1960; 3,433,712 to Gerarde on Mar. 18, 1969; 3,518,804 to Gerarde on July 7, 1970; and 3,779,083 to Ayres et al on Dec. 18, 1973. These references disclose the general pipetting concept and various types of known protective shields used with the pipette.

SUMMARY OF THE INVENTION

With the above background in mind, it is among the primary objectives of the present invention to provide a protective shield for a capillary pipette in general and, in particular, one which is adapted for use as a protective shield for a pipette assembly used for collecting and testing micro-amounts of body fluids such as blood. The shield is designed to be removably mounted on a pipette assembly to protect the micro-pipette when not in use. Furthermore, the shield is designed to facilitate ease of puncture through a diaphragm while including control means to limit the amount of extension through the diaphragm after puncture to reduce the danger of contamination of the end of the outer surface of the shield. Additionally, the shield has a configuration which facilitates nesting of the shield to provide ease of separation when the shields are individually assembled with a pipette assembly as a protective structure. This is particularly true when a stack of shields in nested condition are positioned on an automated assembly mechanism for individual removal and coupling with an individual pipette assembly.

The shield of the present invention consists of a hollow tubular member with a conical tip smoothly extending into a tapered cylindrical portion terminating in a shoulder. The shoulder extends into a wider cylindrical portion terminating in an open end surrounded by an annular flange. The interior of the body is hollow and the inner surface has a configuration substantially conforming to the outer surface of the shield. The outside and inside configurations of each shield are designed so that the shields may be stacked but will not lock together. Despite the amount of force used to push the shields together into a nested relationship they will separate by gravity when turned downward passed the horizontal. They will not frictionally interengage or lock together. Thus, no additional force is required to separate them.

The non-locking feature of the present design facilitates automatic feeding since no physical force is necessary to remove them from nested interengagement since they will separate by the force of gravity alone.

Furthermore, the material of the present shield is of a type having natural lubricity which facilitates puncturing of a sealed container to reach the contents of the container. For example, the container can be a sealed reservoir containing a medicament or diluent to be combined with a blood sample.

It should be kept in mind that the outer configuration of the shield with the integral stop formed by the shoulder prevents the shield from being inserted too far through the diaphragm of the sealed container. This eliminates the danger of the shield becoming stuck or wedged into the diaphragm or possible contamination of the end of the shield.

In summary, the shield of the present invention is adapted for use in protecting a capillary pipette of a pipette assembly. The shield includes a hollow tubular body closed at one end and open at the other end. The open end of the shield has means thereon for removably mounting the shield on a pipette assembly with the capillary pipette thereof in protected position in the hollow tubular body. The body is formed at the closed end to facilitate use of the shield as a puncturing device and has a shoulder intermediate its ends to provide a stop for preventing over extension of the closed end when used as a puncturing device. The shoulder also provides an engaging surface for the open end of another shield when at least two shields are nested together with the closed end of one shield extending into the open end of the next shield. In this manner, the degree of nesting is controlled and ease of removal of each shield for use is facilitated.

With the above objectives among others in mind, reference is made to the attached drawings.

DETAILED DESCRIPTION

Figure 1:
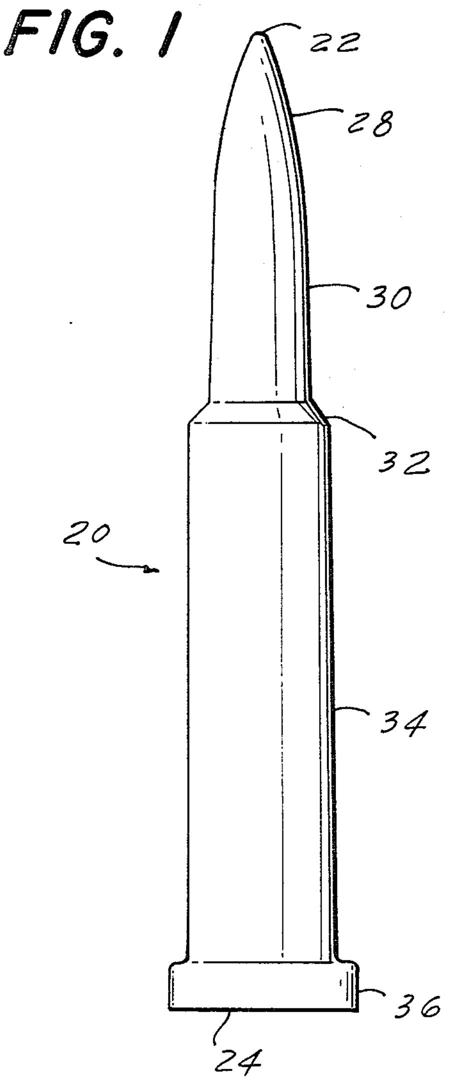
FIG. 1 is a side elevation view of a shield of the invention.
Figure 3:
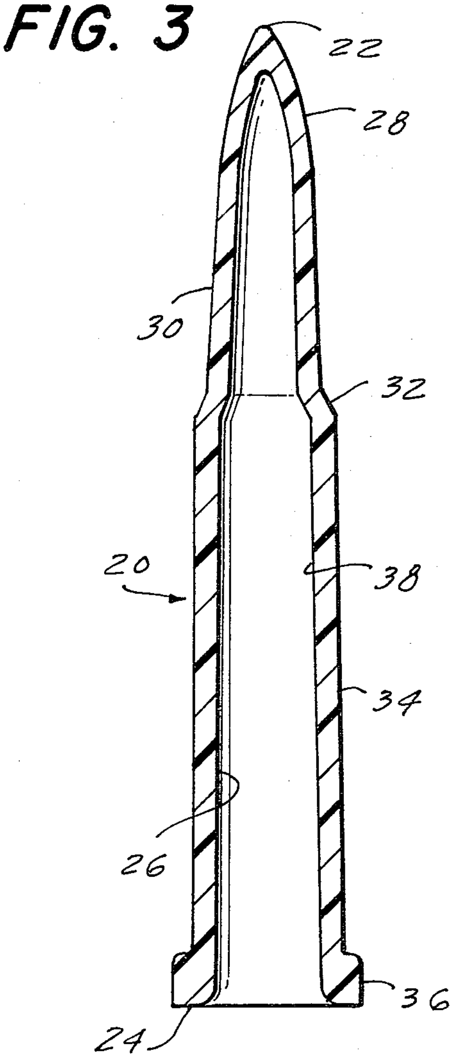
FIG. 3 is a sectional side elevation view thereof taken along the plane of line 3—3 of FIG. 2.
Figure 4:
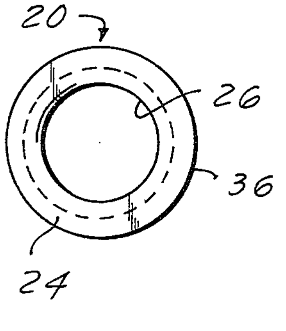
FIG. 4 is a bottom plan view thereof.
Figure 2:
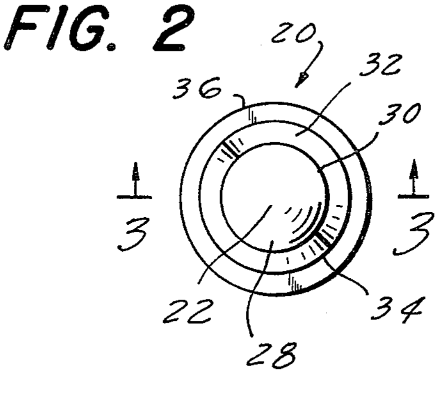
FIG. 2 is a top plan view thereof.

While the shield of the present invention is designed to be used with many different types of micro-pipette assemblies, such as those depicted and described in the above referenced patents, in the depicted embodiment it is used in a conventional type of miro-pipetting system commonly used to take a small sample of blood from a patient and transfer the blood to a reservoir containing a diluent, and other medicaments if desired, for testing and evaluation purposes.

Shield 20 is formed of an inexpensive material lending itself to disposability such as a common plastic. It is also desirable to use a material which has natural lubricity to facilitate use of portions of the shield 20 as a puncturing device by making it easier to insert and remove the shield from the punctured article. An example of an acceptable material for this purpose is polypropylene 6513 manufactured by Hercules Inc. 380 Madison Avenue of New York, N.Y.

Shield 20 is generally tubular in configuration with a closed forward tip 22 and an open rear end 24 permitting access to chamber 26 in the hollow interior of the shield. Tip 22 is pointed on its outer surface and forms the apex of a conical tip portion 28. The conical tip portion extends into an integral cylindrical portion 30 which terminates in a frustoconically shaped outwardly extending shoulder 32. The shoulder has a rear cylindrical portion 34 extending therefrom which terminates in open end 24. The open end 24 is surrounded by a flange or rim 36. The inner surface 38 of the shield corresponds generally in configuration to the outer surface of the shield as described above.

It has been found to be advantageous to apply a slight taper to the inner and outer surfaces of the cylindrical portions 30 and 34 of the shield, such as up to 15 degrees in a direction tapering inwardly toward the tip 22. Thus, open end 24 is wider than the opposite closed end 22. This facilitates insertion and removal of the shield on a pipette assembly and also assists in the stacking and unstacking of shield 20 as depicted in FIG. 5.

Figure 6:
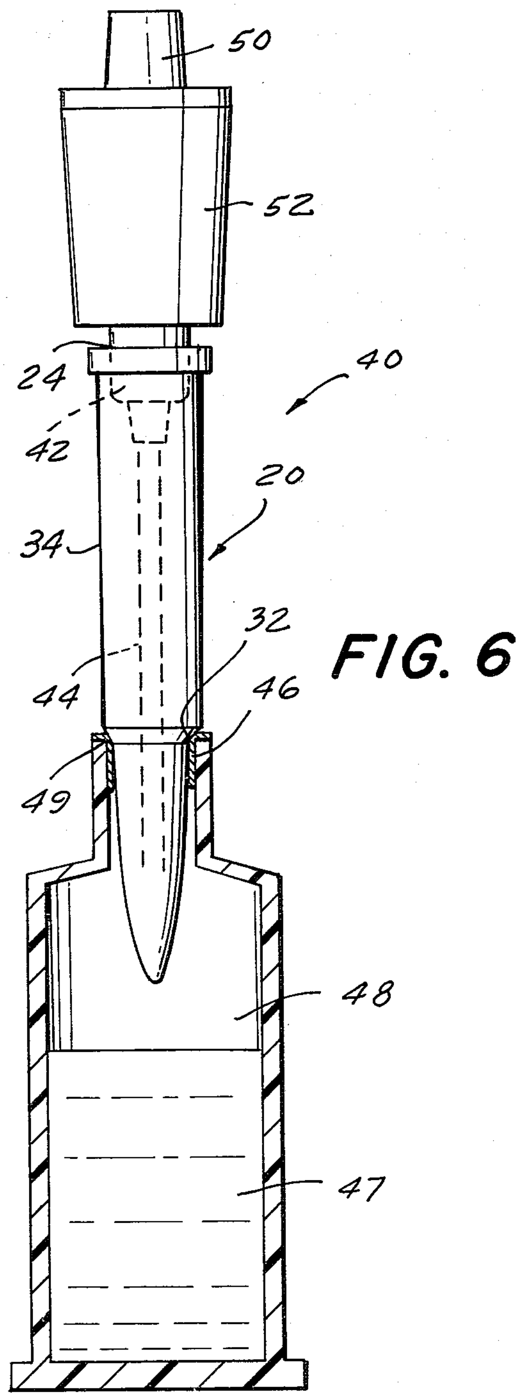
FIG. 6 is a partially sectional elevation view of a shield of the invention mounted on a pipette assembly and being used as a puncturing device to puncture a diaphragm to permit entry into a sealed container.

Tip 22 is pointed to facilitate puncturing of a diaphragm with the shield as depicted in FIG. 6 and the natural lubricity of the material of shield 20 assists in this puncturing and removal action.

Figure 5:
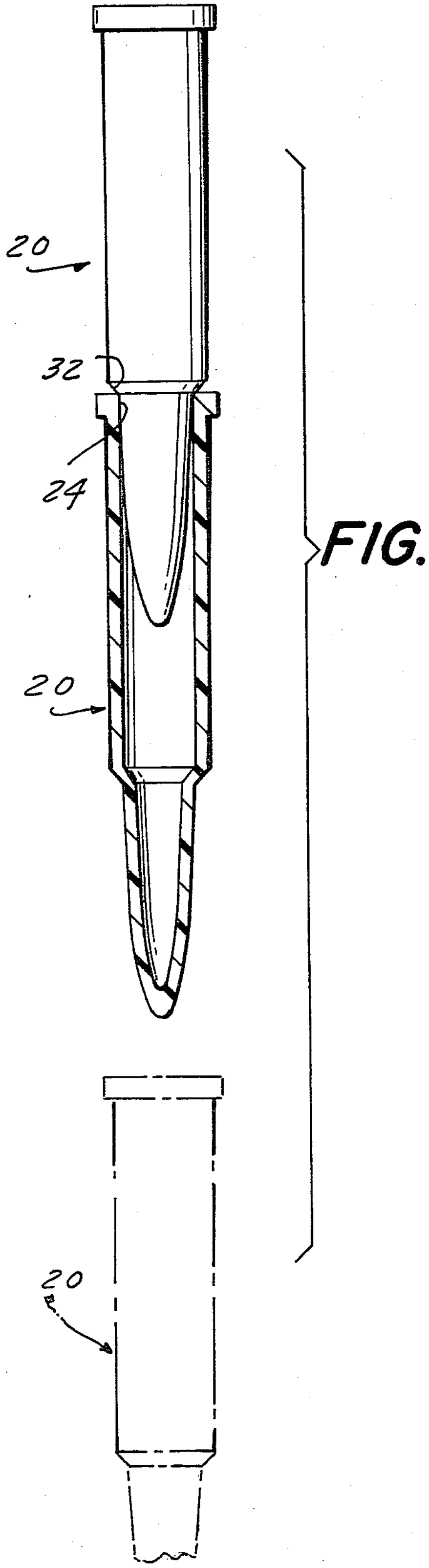
FIG. 5 is a partially sectional elevation view of a plurality of shields nested together with one removed shield shown in phantom.

In use, as shown in FIG. 5, prior to assembly of the shield to a micro-pipette, the shields may be nested or stacked in position for rapid removal in a one by one sequence for attachment to individual pipette assemblies. This can be done manually or by an automated piece of machinery.

The degree of nesting of shields 20 is controlled by positioning of shoulder 32 with respect to the length of the shield. As shown, it has been found effective to locate the shoulder at a point intermediate the ends and approximately one third of the distance from the closed end 22 to the rear open end 24. Thus, when one shield is inserted onto the tip 22 of the next shield it can be moved until the rear end containing flange 36 engages with shoulder 32 which has a wider outer diameter than opening 24 in the shield. Thus, there is no tight frictional interengagement between successive shields such as would occur if the shields were extended fully onto one another until they frictionally lock. Therefore, there is no difficulty in removing a shield since there is sufficient clearance between the outer surface of portions 28 and 30 and the inner surface of rear cylindrical portion 34 on the next shield. In fact, gravity is sufficient to displace one shield from the other. If the nested shields are turned downward from the horizontal, the forward shield slips off under the force of gravity. No additional force is required. A removed shield is shown in phantom in FIG. 5.

When used as a puncturing implement in mounted position on a pipette assembly as depicted in FIG. 6, the tip 22 can be extended through the diaphragm 46 of reservoir 48 until shoulder 32 engages with a stop surface on the reservoir. Thereafter, the shield can be easily removed from the aperture in the diaphragm 46 and the next procedural step with the equipment can be conducted. The natural lubricity of the material forming shield 20 facilitates entrance and removal of portions 28 and 30 through the diaphragm. The shoulder prevents too deep a penetration thereby alleviating the danger of frictional holding of the shield in the container with the ruptured diaphragm and also eliminating the danger of contamination of the shield by contact with the fluid 47 in the reservoir 48.

The shield has an integrally formed forward end portion consisting of the substantially cylindrical portion 30 extending into shoulder 32 at one end and conical portion 28 at the other end. There is a smooth transition between conical portion 28 and cylindrical portion 30. The interior surface of the shield closely follows the configuration of the exterior surface. The outside and inside configurations are designed so that a plurality of shields may be stacked but will not lock together. Despite the amount of force to push the shields together they will separate by gravity, when turned downward passed the horizontal. Thus, shield 20 in stacked form is easy to feed automatically. Furthermore, the use of a material having natural lubricity for shield 20 makes puncturing of a diaphragm covering a reservoir easier. Additionally, stop 32 on the outer surface of shield 20 prevents shield 20 from being inserted too far into the diaphragm of the reservoir which eliminates the problem of the shield becoming stuck in the diaphragm. As previously discussed, the shoulder also forms a stop to prevent too great a degree of nesting between shields as depicted in FIG. 5.

When assembled to a pipette assembly 40, as depicted in FIG. 6, the inner surface surrounding open end 24 of the shield is frictionally engaged with a hub receiving surface 42 on pipette assembly 40. In this position, the shield surrounds and protects pipette 44. Shield 20 can be used to puncture diaphragm 46 of reservoir 48 by forcing pointed tip 22 through the diaphragm 46. Insertion can proceed until shoulder 32 engages and is stopped by rim 49 of reservoir 48. Thereafter the pipette assembly and coupled shield can be easily removed leaving an opening to the interior of the reservoir. The reservoir is then ready for use. Shield 20 is then disengaged from pipette assembly 40 and the pipette assembly can be used in a conventional fashion with the reservoir to collect the sample. Other depicted portions of pipette assembly 40 include a conventional overflow chamber 50 as part of a holder assembly 52 which captures pipette 44 in one end thereof. A fluid passageway is provided through the pipette assembly from the exposed tip of the pipette to the rear end portion of the holder.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A protective shield for a capillary pipette extending from a pipette assembly comprising:

a hollow tubular, substantially rigid body closed at one end and open at the other end, said body being sufficiently long to envelop a capillary pipette extending from a pipette assembly when said open end is connected to said assembly, said body having a conical portion and a substantially cylindrical portion having a larger diameter than the widest diameter of said conical portion, said closed end being the apex of said conical portion and said open end being at the opposite end of said body and opening into said cylindrical portion, said body including a laterally extending flange surrounding said open end and a shoulder integrally connecting the conical and substantially cylindrical portions, the widest part of said shoulder on the outside surface of said body having a diameter greater than the diameter of said open end, said shoulder providing stop means for preventing over extension of the closed end when used as a puncturing device, said conical and substantially cylindrical portions of said body tapering outwardly from the closed end toward the open end in varying predetermined degrees along their lengths, said shoulder being positioned at a predetermined distance from the closed end, said tapered body and said shoulder facilitating the nesting of this shield within a lower shield of the same type whereby locking is prevented so that separation of the nested shields occurs under the force of gravity when the inner nested shield is removed from the lower shield by holder means.

2. The invention in accordance with claim 1 wherein the shoulder is an outwardly tapering portion of narrower diameter at the end connected to the conical portion and of wider diameter at the end connected to the cylindrical portion.

3. The invention in accordance with claim 1 wherein the configuration on the inner surface of the hollow tubular body substantially conforms to the configuration of the outer surface thereof.

4. The invention in accordance with claim 1 wherein the shield is formed of a material having a natural lubricity sufficient to facilitate use of the shield as a puncturing device.

5. The invention in accordance with claim 4 wherein the shield is formed of polypropylene material.

* * * * *